(12) United States Patent
Nocon et al.

(10) Patent No.: US 10,339,844 B1
(45) Date of Patent: Jul. 2, 2019

(54) MULTI-PERSPECTIVE DISPLAY OF AN IMAGE

(71) Applicant: Disney Enterprises, Inc., Burbank, CA (US)

(72) Inventors: Nathan Nocon, Valencia, CA (US); Michael P. Goslin, Sherman Oaks, CA (US); Timothy Panec, Studio City, CA (US); Elliott Baumbach, Porter Ranch, CA (US); Jonathan R. Hsu, Pomona, CA (US); Eric C. Haseltine, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/983,006

(22) Filed: May 17, 2018

(51) Int. Cl.
*G09G 3/00* (2006.01)
*G09G 3/20* (2006.01)
*G06T 7/20* (2017.01)
*G05B 15/02* (2006.01)

(52) U.S. Cl.
CPC .............. *G09G 3/003* (2013.01); *G05B 15/02* (2013.01); *G09G 3/2096* (2013.01); *G06T 7/20* (2013.01); *G09G 2320/068* (2013.01); *G09G 2358/00* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| 4,943,851 A | 7/1990 | Lang |
| 5,057,827 A | 10/1991 | Nobile |
| 5,148,310 A | 9/1992 | Batchko |
| 6,115,006 A | 9/2000 | Brotz |
| 6,801,185 B2 | 10/2004 | Salley |
| 7,002,604 B1 | 2/2006 | Barrus |
| 7,490,941 B2 | 2/2009 | Mintz |
| 7,587,120 B2 | 9/2009 | Koo |
| 7,708,640 B2 | 5/2010 | Burak |
| 8,233,032 B2 | 7/2012 | Yukich |
| 8,698,966 B2 | 4/2014 | Liu |

(Continued)

OTHER PUBLICATIONS

Horimai, Hideyoshi, et al. "Full-Color 3D Display System with 360 Degree Horizontal Viewing Angle." *Proc. Int. Symposium of 3D and Contents*, 2010. pp. 1-4.

(Continued)

*Primary Examiner* — Todd Buttram
(74) *Attorney, Agent, or Firm* — Farjami & Farjami LLP (57) ABSTRACT

According to one implementation, an image display system includes a computing platform having a central processing unit (CPU), a system memory storing a software code, a display screen, and a motor controlled by the CPU and coupled to a rotor for rotating the display screen. The CPU is configured to execute the software code to spin the display screen about an axis at a predetermined spin rate using the motor and the rotor, and to render each of multiple perspectives of an image on the display screen at a frame rate during each revolution of the display screen about the axis. The predetermined spin rate is determined based on the number of perspectives of the image rendered per revolution of the display screen and the frame rate.

20 Claims, 5 Drawing Sheets

(56) References Cited

U.S. PATENT DOCUMENTS

| | | | |
|---|---|---|---|
| 9,053,660 B2 | 6/2015 | Liu | |
| 2007/0293299 A1 | 12/2007 | Aida | |
| 2013/0050198 A1* | 2/2013 | Song | F16M 11/08 345/419 |
| 2013/0100358 A1* | 4/2013 | De Collibus | G03B 21/28 348/744 |
| 2014/0118271 A1 | 5/2014 | Lee | |

OTHER PUBLICATIONS

File History of Related U.S. Appl. No. 15/888,896, filed Feb. 5, 2018, and titled "Floating Image Display System".
File History of Related U.S. Appl. No. 15/985,477, filed May 21, 2018, and titled "Electrical Charger for a Spinning Device".
File History of Related U.S. Appl. No. 15/985,502, filed May 21, 2018, and titled "Display of a Floating Image With Depth Enhancement".
File History of Related U.S. Appl. No. 16/011,505, filed Jun. 18, 2018, and titled "Image Display System With Visual Filter".
File History of Related U.S. Appl. No. 16/002,947, filed Jun. 7, 2018, and titled "Image Generation System Including a Spinning Display".

* cited by examiner

MULTI-PERSPECTIVE DISPLAY OF AN IMAGE

BACKGROUND

Display screens provided by most consumer electronic devices such as televisions, mobile phones, and tablet computers, for example, are typically capable of displaying an image from only a single viewing angle. As a result, playing a competitive two-player game requires a split screen when using one conventional display. This is undesirable because splitting the display allows each player to observe the other player's screen. Consequently, in the conventional art, multi-player games typically require the use of multiple displays.

Moreover, in the field of three-dimensional (3D) image projection, several significant obstacles to wider use of 3D imagery in gaming and entertainment exist. For example, although advances in computer technology and software have made possible the creation of richly featured virtual characters having a high degree of realism, such virtual characters can be impractical to project in 3D. Typically, in order to project a 3D image, multiple projectors, augmented reality (AR) headgear, and/or other complex display technology is required to create the illusion of a real-world 3D image. Further complications can occur if the 3D image is to be viewed from multiple perspectives and still maintain a level of realism.

SUMMARY

There are provided systems and methods for displaying multiple perspectives of an image, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
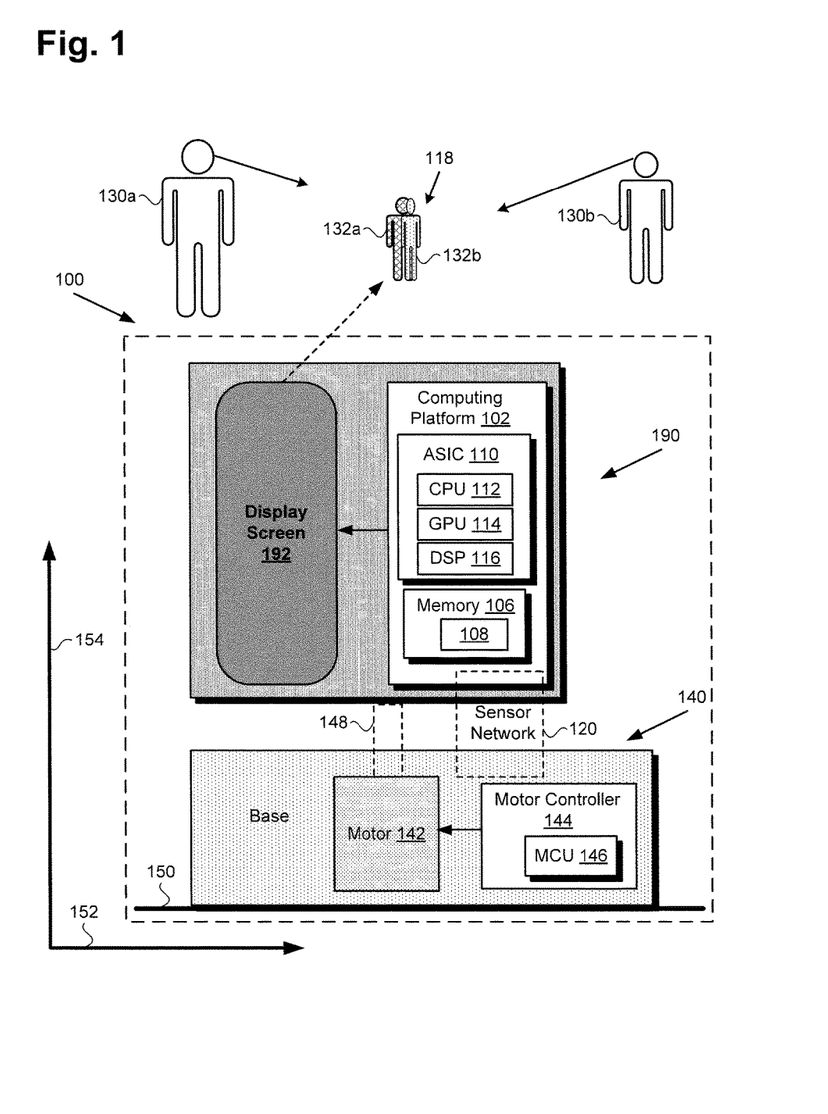
FIG. 1 shows a diagram of an exemplary multi-perspective image display system, according to one implementation.

The present application discloses systems and methods for displaying multiple perspectives for viewing a virtual image and/or multiple separate scenes using a single display that overcome the drawbacks and deficiencies in the conventional art. FIG. 1 shows a diagram of an exemplary multi-perspective image display system, according to one implementation. As shown in FIG. 1, image display system 100 includes image generator 190 configured to rotate, and stationary base 140 coupled to image generator 190 by rotor 148.

As further shown in FIG. 1, image generator 190 includes display screen 192 and computing platform 102 communicatively coupled to display screen 192 so as to control display screen 192. Computing platform 102 includes application specific integrated circuit (ASIC) 110 including central processing unit (CPU) 112 implemented as a hardware processor, graphics processing unit (GPU) 114, and may further include digital signal processor (DSP) 116. Computing platform 102 also includes system memory 106 implemented as a non-transitory storage device storing software code 108.

Base 140 includes motor 142 for rotating rotor 148 and image generator 190, and motor controller circuit 144 including motor control unit (MCU) 146. Base 140 is situated on surface 150, which may be a floor or any other substantially horizontal surface. In addition, FIG. 1 shows horizontal axis 152 substantially parallel to surface 150, and vertical axis 154 substantially perpendicular to surface 150. Also shown in FIG. 1 are sensor network 120 bridging base 140 and image generator 190, and multi-perspective image 118 displayed by image generator 190, as well as observers 130a and 130b viewing respective perspectives 132a and 132b of multi-perspective image 118. It is noted that the combination of computing platform 102 of image generator 190, sensor network 120, and motor controller circuit 144 of base 140 enable the necessary time synchronization between the revolutions per second (rpm) of motor 142 and rotor 148, and the frame rate in frames per second (fps) at which display screen 192 renders images.

By way of definition, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 108, from system memory 106. A GPU is configured to reduce the processing overhead of the CPU by performing computationally intensive graphics processing tasks.

In addition, for the purposes of the present application, the term "perspective" refers to the particular viewing angle from which an object, virtual object, or image is viewed by an observer. Referring to FIG. 1, for example, a perspective of multi-perspective image 118 refers to the viewing angle of an observer of multi-perspective image 118 with respect to a circle substantially concentric with rotor 148 of image display system 100, in a plane substantially perpendicular to vertical axis 154.

Furthermore, the terms "render" and "rendering" are defined to mean causing one or more images to appear on a display screen, such as display screen 192. Thus, rendering an image may mean causing an entirely new image to appear on the display screen, or refreshing an image previously appearing on the display screen. With respect to the term "privacy screen," as used in the present application, privacy screen refers to a film or a structure, such as a louvered structure, affixed to a display screen so as to prevent viewing of the display screen outside of a predetermined viewing angle.

It is noted that although FIG. 1 shows two observers 130a and 130b, that representation is provided merely for conceptual clarity. More generally, observers 130a and 130b may correspond to a single observer, or to more or many more than two observers who may be positioned so as to view multi-perspective image 118 from a variety of perspectives. For example, in some implementations, observers 130a and 130b may be situated so as to view multi-perspective image 118 from a number of discrete perspectives, such as two discrete perspectives located approximately 180° apart on an imaginary 360° circle surrounding multi-perspective image 118 in a plane substantially perpendicular to vertical axis 154. However, in other implementations, observers 130a and 130b may be able to view floating multi-perspective image 118 from the perspectives of other locations on such an imaginary circle surrounding multi-perspective image 118, such as four locations approximately 90° apart on the circle, or twenty locations approximately 18° apart, for example.

Figure 2:
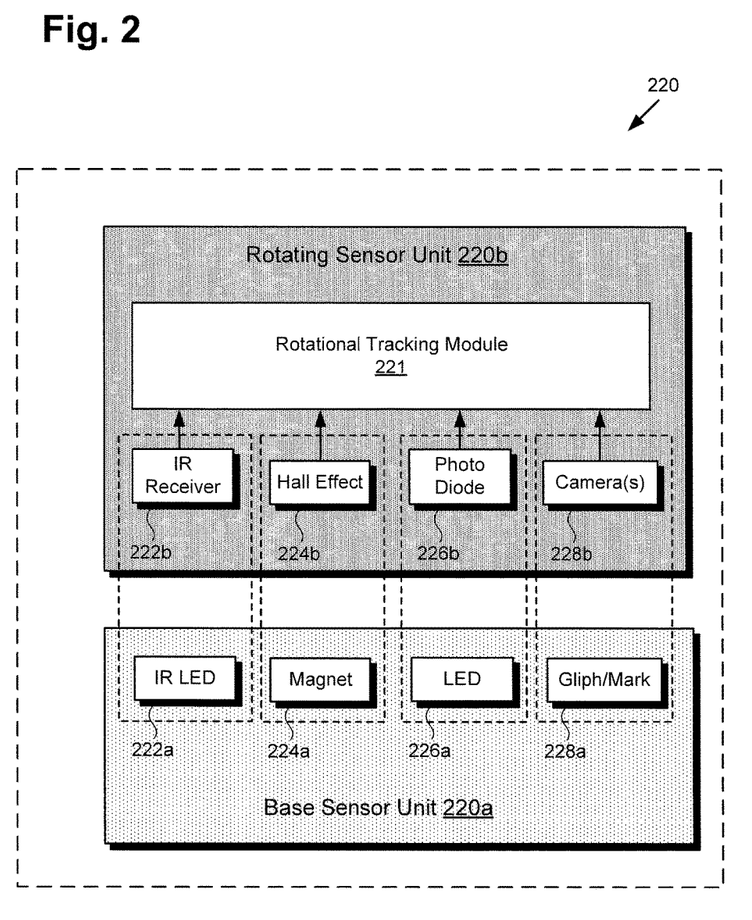
FIG. 2 shows a diagram of exemplary sensors suitable for use as part of a multi-perspective image display system, according to one implementation.

FIG. 2 shows a more detailed exemplary implementation of sensor network 120, in FIG. 1. As shown in FIG. 2, sensor network 120/220 can include base sensor unit 220a integrated with base 140, and rotating sensor unit 220b integrated with image generator 190 and configured to rotate with display screen 192.

According to the exemplary implementation shown in FIG. 2, base sensor unit 220a may include one or more of infrared (IR) light-emitting diode (LED) 222a, magnet 224a, visible light LED 226a, and glyph or other visible marker 228a, to name a few examples. As further shown in FIG. 2, network 120/220 rotating sensor unit 220b may include one or more of IR receiver 222b for sensing IR LED 222a, Hall effect sensor 224b for sensing magnet 224a, photo diode 226b for sensing visible light LED 226a, and one or more camera(s) 228b for sensing glyph or visible marker 228a. In addition, rotating sensor unit 220b is shown to include rotational tracking module 221.

It is noted that the distribution of features identified by reference numbers 222a, 224a, 226a, 228a, 222b, 224b, 226b, and 228b between base sensor unit 220a and rotating sensor unit 220b is merely exemplary. In another implementation, for example, the positions of features 222a, 224a, 226a, 228a, 222b, 224b, 226b, and 228b may be reversed. That is to say, one or more of IR LED 222a, magnet 224a, visible light LED 226a, and glyph or visible marker 228 may be included in rotating sensor unit 220b, while one or more of IR receiver 222b, Hall effect sensor 224b, photo diode 226b, and camera(s) 228b may be included in base sensor unit 220b. It is further noted that camera(s) 228b may include one or more still camera(s) and/or one or more video camera(s), for example.

As indicated in FIG. 2, in some implementations, data from one or more of IR receiver 222b, Hall effect sensor 224b, photo diode 226b, and camera 228b may be included in base sensor unit 220b is processed by rotational tracking module 221 to identify the rotational position of a display screen 192 being tracked by sensor network 120/220 at any point in time. In those implementations, the output from rotational tracking module 221 may be provided to software code 108 to enhance the performance of image display system 100 in presenting perspectives 132a and 132b of multi-perspective image 118 that are appropriate for the respective locations of observers 130a and 130b.

Figure 3:
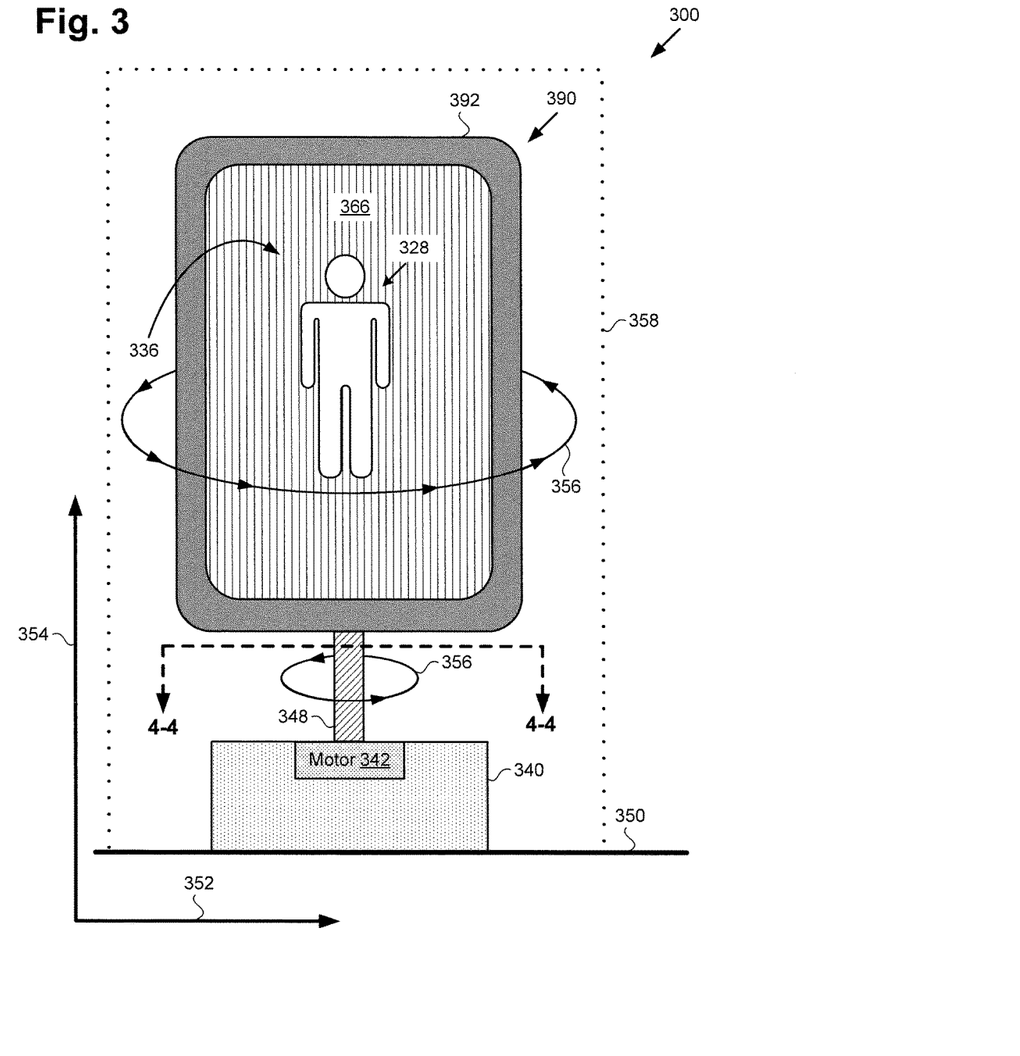
FIG. 3 shows a diagram of an exemplary image display system, according to another implementation.

FIG. 3 shows a diagram of exemplary image generator 390 display system 300, according to another implementation. As shown in FIG. 3, image generator 390 display system 300 includes base 342 and image generator 390. Base 340 is shown to include motor 344, and to be situated on surface 350, which may be a floor or any other substantially horizontal surface. In addition, according to the exemplary implementation shown in FIG. 3, image generator 390 display system 300 includes rotor 348 coupling base 340 to image generator 390.

Image generator 390 includes display screen 392 having optional privacy screen 366 affixed to display surface 336 of display screen 392. Also shown in FIG. 3 are horizontal axis 352 substantially parallel to surface 350, vertical axis 354 substantially perpendicular to surface 350, spin direction 356 of rotor 348 and display screen 392, two-dimensional (2D) image 328 rendered on display screen 392, and masking shutter 358 surrounding base 340, rotor 348, and image generator 390.

Image display system 300 corresponds in general to image display system 100, in FIG. 1. As a result, image display system 300 may share any of the features or functionality attributed to image display system 100, and vice versa. In addition, rotor 348, and base 340 including motor 342, correspond in general to rotor 148, and base 140 including motor 142, in FIG. 1. Thus, rotor 348 and base 340 may share any of the features or functionality attributed to rotor 148 and base 340, and vice versa. That is to say, although not explicitly shown in FIG. 3, base 340 includes features corresponding respectively to motor controller circuit 144 and MCU 146.

Moreover, image generator 390 including display screen 392 corresponds in general to image generator 190 including display screen 192, in FIG. 1. Thus, image generator 390 may share any of the features or functionality attributed to image generator 190 by the present disclosure, and vice versa. In other words, although not explicitly shown in FIG. 3, image generator 390 includes features corresponding respectively to ASIC 110 having CPU 112, GPU 114, and DSP 116, and system memory 106 storing software code 108. Furthermore, like image display system 100, image display system 300 includes sensor network 120/220 bridging base 190/390 and image generator 190/390.

Referring to FIGS. 1 and 3 in combination, according to the exemplary implementation shown in FIG. 3, display screen 392 may be controlled by CPU 112 and/or GPU 114 of ASIC 110, while rotor 148/348 coupled to display screen 192/392 of image generator 190/390 is controlled by CPU 112 of ASIC 110. CPU 112 of ASIC 110 is configured to execute software code 108 to render 2D image 328 on display screen 192/392 using CPU 112 and/or GPU 114.

CPU 112 is further configured to execute software code 108 to utilize motor 142/342 to spin rotor 148/348 and display screen 192/392 about vertical axis 154/354 parallel to display surface 336 of display screen 192/392 at a predetermined spin rate to generate multi-perspective image 118 corresponding to 2D image 328. As a result of the multi-perspective image generation performed by image generator 190/390, multi-perspective image 118 may appear to be floating in space, and/or may appear to be a 3D image corresponding to 2D image 328.

In some implementations, display screen 192/392 may be a liquid-crystal display (LCD) screen, for example. Moreover, in some implementations, display screen 192/392 may be provided by a mobile communication device included as part of image generator 190/390, coupled to rotor 148/348, and configured to spin with display screen 192/392 at the predetermined spin rate. For example, display screen 192/392 may be part of a smartphone or a tablet computer.

In the implementation shown in FIGS. 1 and 3, various features and/or techniques may be utilized to reduce flicker and/or blur of multi-perspective image 118 generated by image generator 190/390. For example, optional privacy screen 366 may be affixed to display surface 336 of display screen 192/392 so as to restrict viewing of display screen 192/392 outside of a predetermined viewing angle. As noted above, such a privacy screen may take the form of a louvered structure affixed to display screen 192/392, or to a privacy film covering display surface 336 of display screen 192/392.

Although, in some implementations, optional privacy screen 366 may be an advantageous or desirable feature for reducing flicker and/or blur, in some other implementations it may be preferable to omit optional privacy screen 366. For example, in implementations in which true volumetric images, such as surfaces of revolution, are to be displayed as multi-perspective image 118, privacy screen 366 may be preferentially omitted.

It is noted that CPU 112 may execute software code 108 to control motor 142/342 in order to spin rotor 148/348 and display screen 192/392 about vertical axis 154/354 at a varying spin rate, or at a substantially constant predetermined spin rate. It is also noted that spin direction 356 may be in either a counter clockwise direction with respect to the plane of horizontal axis 152/352, as shown in FIG. 3, or in a clockwise direction with respect to that plane.

In some implementations, CPU 112 may execute software code 108 to use GPU 114 to change 2D image 328 as rotor 148/348 and display screen 192/392 rotate, so as to generate multiple perspectives of multi-perspective image 118 that are appropriate respectively to the locations of each of observers 130a and 130b. For example, observer 130a located so as to face a front side of multi-perspective image 118 and stationary at that location might consistently view multi-perspective image 118 from a frontal perspective. By contrast, observer 130b located so as to face a backside of multi-perspective image 118, i.e., 180° apart from the perspective of observer 130a, and stationary at that location might consistently view multi-perspective image 118 as if from the rear.

In some use cases, it may be advantageous or desirable to enhance the illusion that multi-perspective image 118 is floating in space independently of image generator 190/390. When implemented for those use cases, image generator 190/390 may further include masking shutter 358. Masking shutter 358 may be implemented as a liquid-crystal shutter, such as a polymer-dispersed liquid-crystal, or "smart glass" shutter, surrounding base 140/340, rotor 148/348, and display screen 192/392. In those implementations, masking shutter 358 may be controlled by computing platform 102 to remain opaque so as to obscure base 140/340, rotor 148/348, and display screen 192/392 while display screen 192/392 is spun up to generate multi-perspective image 118. Masking shutter 358 may then be controlled by computing platform 102 to transition from opaque to transparent to reveal multi-perspective image 118 as though spontaneously generated in space.

Figure 4:
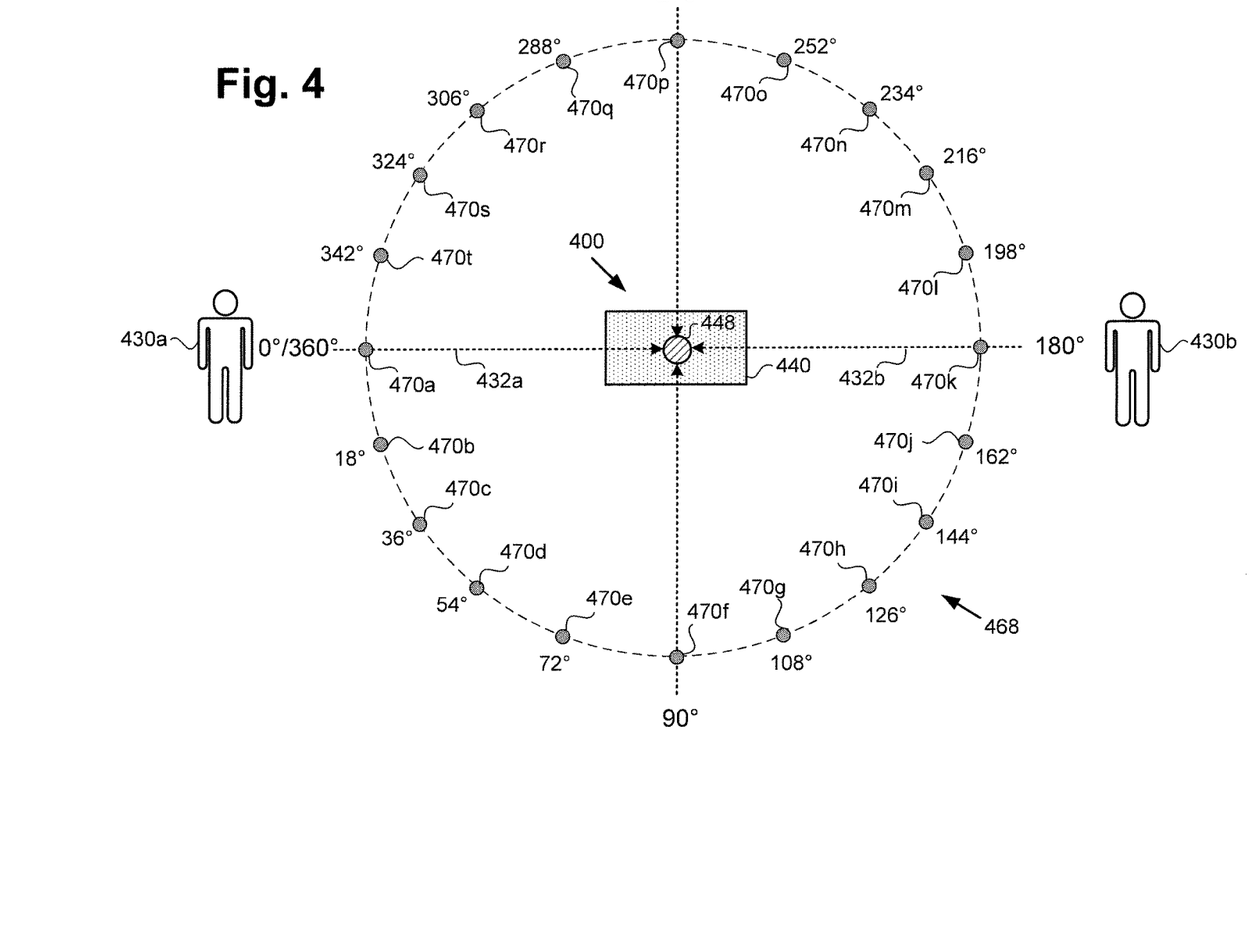
FIG. 4 shows a diagram of exemplary locations for viewing different perspectives of an image displayed by the systems and according to the methods disclosed in the present application.

FIG. 4 shows a top view of a multi-perspective image viewing environment including image display system 400 along perspective lines 4-4 in FIG. 3. It is noted that display screen 192/392, motor 142/342, motor controller circuit 144 including MCU 146, sensor network 120/220, and computing platform 102 are not shown in FIG. 4 in the interests of conceptual clarity.

As shown in FIG. 4, the multi-perspective image viewing environment also includes circle 468 of exemplary locations 470a, 470b, 470c, 470d, 470e, 470f, 470g, 470h, 470i, 470j, 470k, 470l, 470m, 470n, 470o, 470p, 470q, 470r, 470s, and 470t (hereinafter "locations 470a-470t") from which to observe multi-perspective image 118. Also shown in FIG. 4 are observer 430a viewing perspective 432a of multi-perspective image 118, observer 430b viewing perspective 432b of multi-perspective image 118, and base 440 and rotor 448 of image display system 400. It is noted that circle 468 of exemplary locations 470a-470t for viewing multi-perspective image 118 is substantially concentric with respect to rotor 448.

Image display system 400 including base 440 and rotor 448 corresponds in general to image display system 100/300 in FIGS. 1 and 3. Thus, image display system 400, base 440, and rotor 448 may share any of the features and functionality attributed to image display system 100/300, base 140/340, and rotor 148/348 by the present disclosure, and vice versa. In addition, observer 430a, observer 430b, perspective 432a, and perspective 432b correspond respectively in general to observer 130a, observer 130b, perspective 132a, and perspective 132b, in FIG. 1.

In one exemplary use case, observer 130a/430a may be at location 470a corresponding to a zero crossing of circle 468, i.e., 0° or 360° along the circumference of circle 468, as detectable using sensor network 120/220. From that location, observer 130a/430a may face a front side of multi-perspective image 118, for example, and view multi-perspective image 118 displayed by image display system 100/300/400 from frontal perspective 432a. By contrast, observer 130b/430b located so as to face a backside of multi-perspective image 118 from location 470k, i.e., a location 180° apart from location 470a of observer 130a/430a with respect to circle 468, would view multi-perspective image 118 as if from rear perspective 432b. In other words, in an exemplary use case in which multi-perspective image 118 is observable from two locations corresponding to location 470a and 470b, image generator may display two perspectives of multi-perspective image 118.

In other use cases, however, more perspectives of multi-perspective image 118 may be displayed. For example, in one implementation, circle 468 may include four locations for viewing multi-perspective image 118 that are 90° apart with respect to circle 468, e.g., locations 470a, 470f, 470k, and 4'70p. In that implementation, perspectives 432a and 432b may once again be respective frontal and rear perspectives of multi-perspective image 118, while the perspectives viewable from locations 470f and 470p may be opposing side views of multi-perspective image 118 (i.e. left and right side view perspectives).

As another example, in implementations in which circle 468 includes twenty locations for viewing multi-perspective image 118, e.g., locations 470a-470t, each of those locations may be 18° apart with respect to circle 468. In that implementation, image generator 100/300/400 may be configured to display twenty distinct perspectives of multi-perspective image 118 that correspond respectively to locations 470a-470t. It should be understood, that with an increasing spin rate and an increasing number of alternating and distinct views (e.g. 360 distinct views), greater resolution for a 360° view can be achieved.

Figure 5:
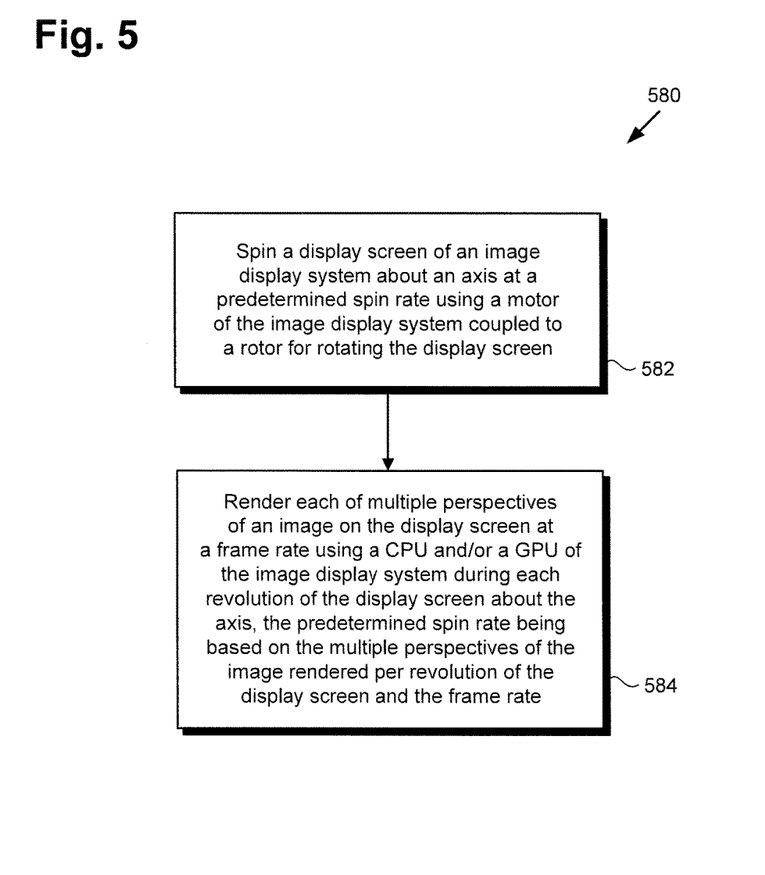
FIG. 5 shows a flowchart outlining an exemplary method for displaying multiple perspectives of an image, according to one implementation.

The functionality of image display system 100/300/400 including base 140/340/440 image generator 190/390 will be further described by reference to FIG. 5. FIG. 5 shows flowchart 580 of an exemplary method for displaying multiple perspectives of an image, according to one implementation. With respect to the method outlined in FIG. 5, it is noted that certain details and features have been left out of flowchart 580 in order not to obscure the discussion of the inventive features in the present application.

Referring to FIG. 5 in combination with FIGS. 1, 3, and 4, flowchart 580 begins with spinning display screen 392 of image display system 100/300/400 about vertical axis 154/354 at a predetermined spin rate using motor 142/342 coupled to rotor 148/348/448 (action 582). As noted above, in some implementations, CPU 112 of ASIC 110 may be configured to execute software code 108 to control motor 142/342 to spin rotor 148/348/448 and display screen 192/392 about vertical axis 154/354 parallel to display surface 336 of display screen 192/392 at a predetermined spin rate, which may be on the order of approximately one or more tens or hundreds of rotations per second, for example.

According to various implementations of the present inventive concepts, the predetermined spin rate of rotor 148/348/448 and display screen 192/392 may depend in part on the frame rate of image generator 190/390. As known in the art, the term "frame rate" refers to the rate or frequency with which a new frame can be rendered on a display, expressed in frames per second (fps). Thus, frame rate is to be distinguished from refresh rate, which is the rate or frequency with which the same frame can be redrawn on a display.

Flowchart 580 may continue with rendering each of multiple perspectives of 2D image 328 on display screen 192/392 at the frame rate of image generator 190/390 using CPU 112 and/or GPU 114 during each revolution of display screen 192/392 about vertical axis 154/354 (action 584). Rendering of each of the multiple perspectives of 2D image 328 on display screen 192/392 may be performed by software code 108, executed by CPU 112.

In addition to the frame rate of image generator 190/390, the predetermined spin rate with which rotor 148/348/448 and display screen 192/392 spin or rotate may be based on the number of perspectives of multi-perspective image 118 to be generated by image display system 100/300/400. Generally, the predetermined spin rate may be substantially equal to the frame rate of image generator 190/390 divided by the number of perspectives of 2D image 328 rendered on display screen 192/392 per revolution of rotor 148/348/448 and display screen 192/392.

For example, where the frame rate of image generator 190/390 is sixty frames per second (60 fps) and two perspectives of 2D image 328 are rendered on display screen 192/392 per revolution of rotor 148/348/448 and display screen 192/392, e.g., at locations 470a and 470k, the predetermined spin rate of rotor 148/348/448 can be thirty hertz (30 Hz). As another example, where the frame rate of image generator 190/390 is 120 fps and four perspectives of 2D image 328 are rendered per revolution of rotor 148/348/448 and display screen 192/392, e.g., at locations 470a, 470f, 470k, and 470p, the predetermined spin rate of rotor 148/348/448 can also be 30 Hz.

In implementations in which more than four perspectives of 2D image 328 are desired per revolution of rotor 148/348/448 and display screen 192/392, image generator 190/390 may be configured to have a higher frame rate. For example, where the frame rate of image generator 190/390 is 240 fps, four perspectives of 2D image 328 may be rendered per revolution of rotor 148/348/448 and display screen 192/392 at a predetermined spin rate of 60 Hz, while eight perspectives of 2D image 328 may be rendered at a predetermined spin rate of 30 Hz. As yet another example, where the frame rate of image generator 190/390 is 1000 fps and twenty perspectives of 2D image 328 are rendered per revolution of rotor 148/348/448 and display screen 192/392, e.g., at each of locations 470a-470t, the predetermined spin rate of rotor 148/348/448 can be 50 Hz.

In one implementation, each perspective of multi-perspective image 118 may correspond to a virtual camera of a virtual world, such as provided by a game engine. For example, multiple perspectives of multi-perspective image 118 may be provided as though captured by a virtual camera revolving around image display system 100/300/400 on circle 468 in synchronization with rotor 148/348/448 of image display system 100/300/400. As a result, in that implementation, CPU 112 of ASIC 110 may be configured to execute software code 108 to render multi-perspective image 118 so as to include virtual world imagery synchronized with the respective real world perspectives of observers 130a/430a and 130b/430b appropriate to their respective locations.

It is noted that, in some implementations, it may be advantageous or desirable to track the movement of one of observers 130a/430a or 130b/430b relative to image generator 190/390 and to render 2D image 328 on display screen 192/392 so as to be viewable by that observer from the same perspective at all locations. For example, where observer 130a/430a is the subject of the tracking, one or more of camera(s) 228b of sensor network 120/220 may be utilized to determine the location of observer 130a/430a relative to image generator 190/390, i.e., the position of observer 130a/430a with respect to exemplary locations 470a-470t of circle 468.

In those implementations, the same perspective of 2D image 328 rendered on display screen 192/392 and viewed by observer 130a/430a at a first location, e.g., location 470a, can be refreshed for viewing by that observer from another location. As a result, when observer 130a/430a moves to location 470p, for example, the same perspective of 2D image 328 viewed at location 470a can be refreshed so as to be viewable by observer 130a/430a from location 470p. However, the perspective of 2D image 328 viewable by an observer whose location is not being tracked, e.g., observer 130b/430b may change as observer 130a/430a changes locations.

As a specific example, and in use cases in which image generator 190/390 is implemented to provide four distinct perspectives of multi-perspective image 118, observer 130a/430a may view a frontal perspective of 2D image 328 at location 470a while observer 130b/430b views a rear perspective from location 470k. Subsequent movement of observer 130a/430a to location 470p would result in observer 130a/430a continuing to view the same frontal perspective of 2D image 328 from location 470p, but observer 130b/430b remaining at location 470k would now view a side perspective of 2D image 328.

Thus, the present application discloses systems and methods for displaying multiple perspectives for viewing a virtual image and/or multiple scenes using a single display. By spinning a display screen upon which a 2D image is rendered, about an axis, the present display solution is capable of generating an apparently floating image that may appear to be 3D. In addition, by rendering multiple perspectives of the image on the display screen during each revolution of the display screen about the axis, the present display solution enables observers at various locations to see different perspectives of the image. As a result, the display solutions disclosed in the present application advantageously enable an observer of the image to view a perspective of the image that is appropriate to the location of the observer.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image display system comprising:
   a computing platform including a central processing unit (CPU) and a system memory storing a software code;
   a display screen;
   a motor coupled to a rotor for rotating the display screen, the motor controlled by the CPU;
   the CPU configured to execute the software code to:
      spin the display screen about an axis at a predetermined spin rate using the motor and the rotor; and
      render each of a plurality of perspectives of an image on the display screen at a frame rate during each revolution of the display screen about the axis, the predetermined spin rate being based on the plurality of perspectives of the image rendered per revolution of the display screen and the frame rate;
      wherein the predetermined spin rate of the display screen is substantially equal to the frame rate divided by the plurality of perspectives of the image rendered per revolution of the display screen.

2. The image display system of claim 1, further comprising a privacy screen affixed to a display surface of the display screen.

3. The image display system of claim 1, wherein the plurality of perspectives includes two perspectives observable 180° apart with respect to a circle concentric with the rotor.

4. The image display system of claim 1, wherein the plurality of perspectives includes four perspectives observable 90° apart with respect to a circle concentric with the rotor.

5. The image display system of claim 1, wherein the plurality of perspectives includes twenty perspectives observable 18° apart with respect to a circle concentric with the rotor.

6. The image display system of claim 1, wherein the image appears to be floating in space.

7. The image display system of claim 1, wherein the image appears to be a three-dimensional (3D) image.

8. The image display system of claim 1, further comprising a mobile communication device, the mobile communication device providing the display screen and configured to spin with the rotor at the predetermined spin rate.

9. The multi-perspective image display system of claim 8, wherein the mobile communication device is one of a smartphone and a tablet computer.

10. A method for use by an image display system including a computing platform having a central processing unit (CPU), a system memory storing a software code, a display screen, and a motor coupled to a rotor for rotating the display screen, the method comprising:
    spinning, using the CPU and the motor coupled to the rotor, the display screen about an axis at a predetermined spin rate; and
    rendering, using the CPU, a plurality of perspectives of an image on the display screen at a frame rate during each revolution of the display screen about the axis;
    wherein the predetermined spin rate is based on the plurality of perspectives of the image rendered per revolution of the display screen and the frame rate, and wherein the predetermined spin rate of the display screen is substantially equal to the frame rate divided by the plurality of perspectives of the image rendered per revolution of the display screen.

11. The method of claim 10, wherein the image display system further comprises a privacy screen affixed to a display surface of the display screen.

12. The method of claim 10, wherein the plurality of perspectives includes two perspectives observable 180° apart with respect to a circle concentric with the rotor.

13. The method of claim 10, wherein the plurality of perspectives includes four perspectives observable 90° apart with respect to a circle concentric with the rotor.

14. The method of claim 10, wherein the plurality of perspectives includes twenty perspectives observable 18° apart with respect to a circle concentric with the rotor.

15. The method of claim 10, wherein the image appears to be floating in space.

16. The method of claim 10, wherein the image appears to be a three-dimensional (3D) image.

17. The method of claim 10, wherein the image display system further comprises a mobile communication device, the mobile communication device providing the display screen and configured to spin with the rotor at the predetermined spin rate.

18. The method of claim 17, wherein the mobile communication device is one of a smartphone and a tablet computer.

19. An image display system comprising:
    a computing platform including a central processing unit (CPU) and a system memory storing a software code;
    a display screen;
    a motor coupled to a rotor for rotating the display screen, the motor controlled by the CPU;
    the CPU configured to execute the software code to:
       spin the display screen about an axis at a predetermined spin rate using the motor and the rotor; and
       render each of a plurality of perspectives of an image on the display screen at a frame rate during each revolution of the display screen about the axis, the predetermined spin rate being based on the plurality of perspectives of the image rendered per revolution of the display screen and the frame rate;
       wherein the predetermined spin rate of the display screen is equal to the frame rate divided by the plurality of perspectives of the image rendered per revolution of the display screen.

20. The image display system of claim 19, wherein the plurality of perspectives includes four perspectives observable 90° apart with respect to a circle concentric with the rotor.

* * * * *